United States Patent [19]

King

[11] 4,409,488
[45] * Oct. 11, 1983

[54] RADIOACTIVE MATERIAL DOSE COMPUTER

[76] Inventor: Russell W. King, 1220 Via Granate Ave., Sierra Madre, Calif. 91024

[*] Notice: The portion of the term of this patent subsequent to May 26, 1998 has been disclaimed.

[21] Appl. No.: 241,026

[22] Filed: Mar. 6, 1981

[51] Int. Cl.³ .............................................. G01N 23/10
[52] U.S. Cl. ............................ 250/432 PD; 250/336.1
[58] Field of Search ............ 250/336, 432 PD, 432 R, 250/364

[56] References Cited

U.S. PATENT DOCUMENTS 4,084,097 4/1978 Czaplinski et al. .......... 250/432 PD
4,270,052 5/1981 King .............................. 250/432 PD Primary Examiner—Bruce C. Anderson
Attorney, Agent, or Firm—James E. Brunton

[57] ABSTRACT

An electronic device for rapidly determining the concentration (i.e. mCi/cc) of radioactivity in a closed container, and for determining the volume of material needed to be removed such that the removed volume will constitute a predetermined amount of radioactivity, is disclosed; the device further incorporating novel features so that said determinations, and actual withdrawal of the desired amount radioactivity material may be accomplished without removing the closed container from its leaded radiation shield. This device also has provision for determining the percentage relationship of Molybdenum impurities in Technetium $^{99M}$, and further provided an electro-mechanical carrousel-type means for systematically positioning multiple source containers as desired by the user thereof.

16 Claims, 4 Drawing Figures

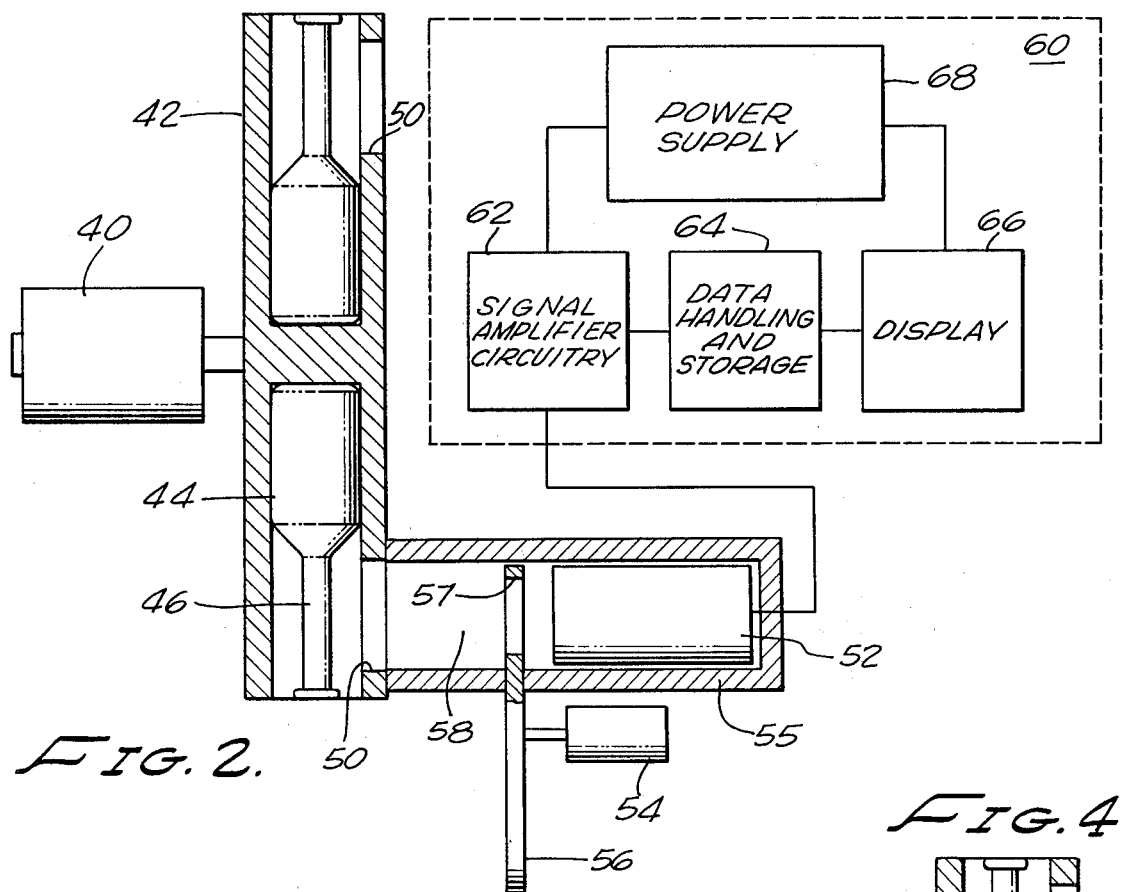
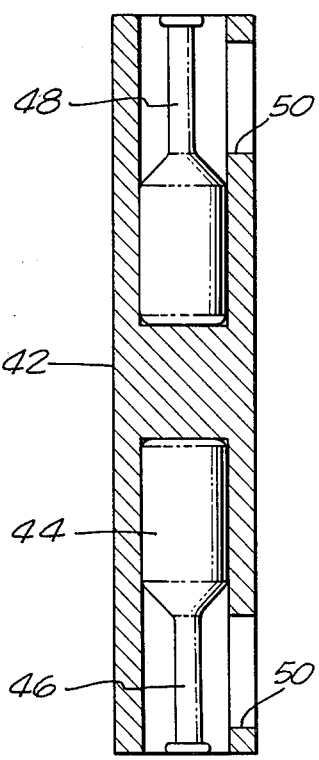
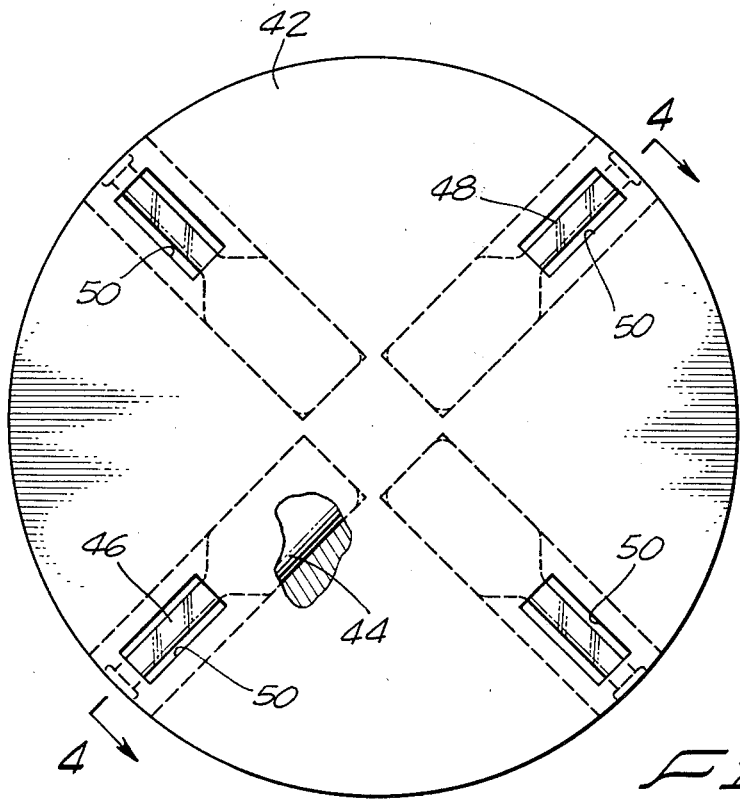

RADIOACTIVE MATERIAL DOSE COMPUTER

BACKGROUND OF THE INVENTION

1. Field of the Invention

This invention generally relates to instrumentation for use in the field of measurement of radioactive materials, and more particularly relates to instrumentation for the use thereof in the field of Medicine.

2. Prior Art

The medical use of radioactive materials for both diagnostic and therapeutic purposes is well recognized, known and documented, and has been an accepted standard practice in most hospitals for many years. When using radioactive materials from a multidose container, the determination of the volume to withdraw for a desired patient dose is complicated by various factors such as the half-life of the radioactive material, the energy of the material, the volume of the container, and the attenuation of the gamma rays by the container walls. One method used is to place the source container in a well-type detector of an electronic device called a dose calibrator. If this dose calibrator device has been properly calibrated and adjusted to compensate for the energy of the isotope and attenuation due to the container walls, it will provide a reading of the radioactivity of the material contained therein. With this premise, if the technologist knows the volume of the contained radioactivity, a calculation of the concentration can be made, and the volume required for the patient dose may be determined. Among the drawbacks to this method are that the container holding the radioactive material must be removed from its leaded radiation shield thereby subjecting the operator to a radiation hazard, and that this procedure entails several mathmatical calculations. Since both dose withdrawal and half-life of the source affect the remaining amount of radioactivity, a record of withdrawals, with respect to time and quantity, must be maintained for each successive calculation or determination.

Thus, because of the radiation hazard, complexity of calculations and attendant record keeping, a novel device for storing radioactive materials, having provision for determining both the concentration and the volume required for a patient dose, and for removal of said material from its container would be useful in the nuclear medicine department of all hospitals or other facilities engaged in similar activities.

SUMMARY OF THE INVENTION

Applicant herein has conceived of a new and useful apparatus for the direct determination of the concentration (mCi/cc) of radioactive materials, and for subsequent determination of the volume to be removed from a multidose shielded container to produce a predetermined dose of radioactivity. Said determinations may be made without prior knowledge of the volume of material contained within the multidose container, and without removal of the source container from its lead shield.

The apparatus incorporates the use of a specially-designed container which has a capillary-type neck extending between the main body and the container opening which is sealed with a rubber septum. The capillary-neck is designed such that when properly positioned with respect to a radiation detector, only that radiation emitting from material in the neck will be sensed by the detector. Additionally, the source of this radiation is a fixed and known volume of radioactive material, determined by the specific design of the container neck itself.

A mechanical device provides a means for geometrically positioning the multidose container easily and accurately in relation to a radiation detector. This device also constitutes the protective lead shielding around the container of the radioactive material, and further provides proper positioning of the multidose container such that the desired dose may be easily and safely removed with a sterile syringe and needle by a technologist-operator.

The apparatus is designed such that when depleted, the multidose container may be easily removed and replaced with a new container.

The radiation detector which is exposed to the radioactive material in the container neck is housed in lead to prevent operator exposure to gamma rays from the source, and also to prevent erroneous readings due to extraneous radiation.

Commonly-known electronic circuitry is used to provide operating voltages, signal amplification, and data manipulation.

A reading of the concentration (mCi/cc) in the source container is displayed in a digital mode, and this information also is stored for further use in calculation of the volume to be removed which corresponds to a predetermined dose of radioactivity.

The present invention has several features of novelty over prior art for determining concentration of radioactive materials, calculations of volume of material required to produce a predetermined dose, and ease of removal thereof from a shielded multidose container.

It is, therefore, an object of this invention to be able to directly determine the concentration of radioactivity of material stored in a shielded container.

It is another objective of this invention to present and/or store radioactivity concentration data such that it may be used for determining the volume of material required to produce a predetermined dose.

It is still another object of this invention to provide the capability of both of the foregoing features without removing the source container from it's lead housing.

It is still another object of this invention to provide a means for automatically determining the percentage of one radioisotope in a container in the presence of another, providing the energy separation falls within the design parameters of the particular device; a specific example being the determination of the percentage of Molybdenum impurities in Technetium $^{99M}$.

It is still another object of this invention to provide a mechanical means for handling only one soruce container, or, in the alternative, a mechanical means for automatically positioning any of several containers as desired by the user.

BRIEF DESCRIPTION OF THE DRAWINGS

FIG. 2 shows another embodiment of the invention wherein multiple containers are enclosed within a carrousel which may be motor-driven. It also shows a block diagram for an electronics signal processing system similar to the one in FIG. 1.

FIG. 3 shows a schematic layout of the multiple containers and carrousel enclosure of FIG. 2.

FIG. 4 is sectional view of the carrousel of FIG. 3 taken along the line 4—4 in FIG. 3.

DETAILED DESCRIPTION

Figure 1:
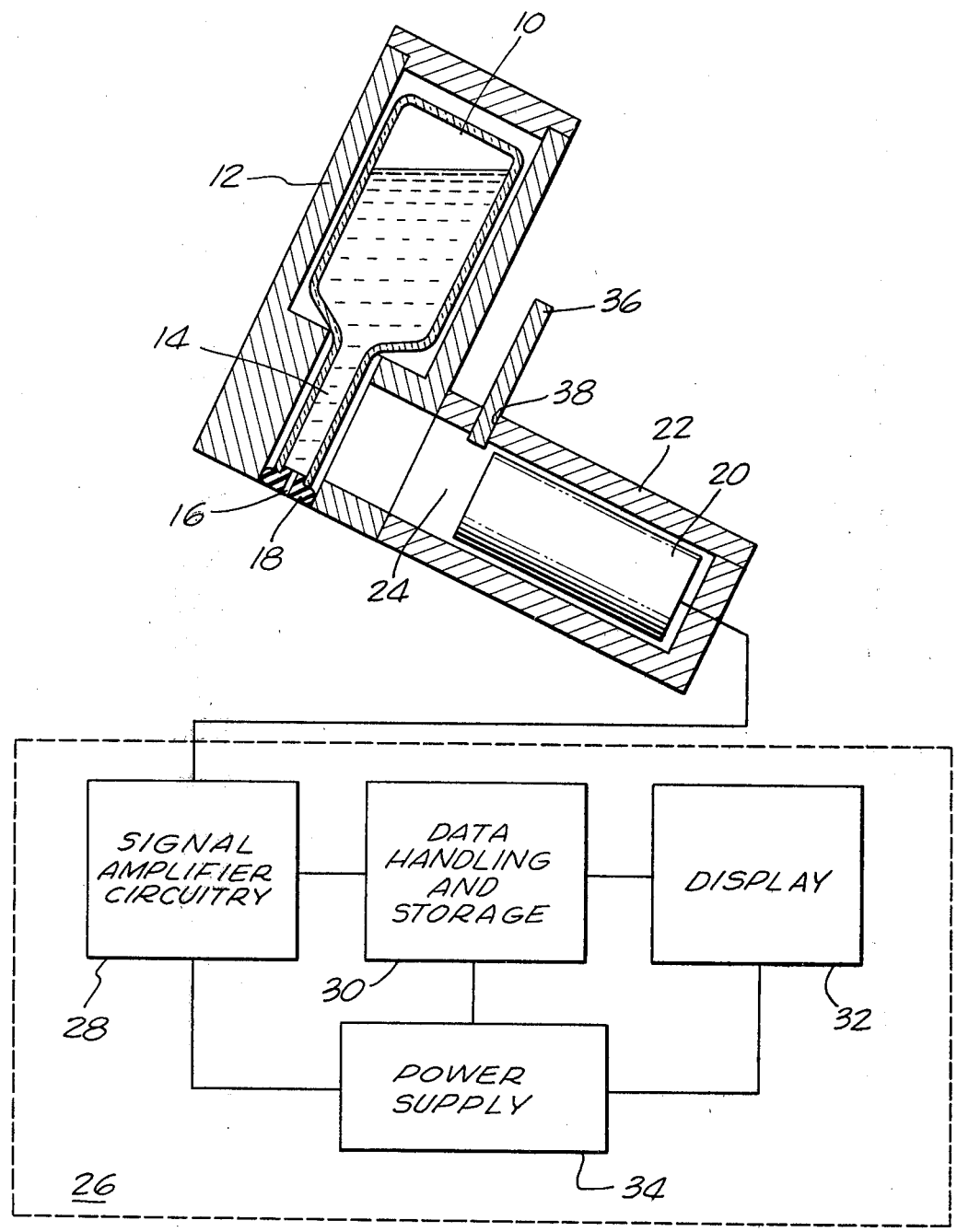
FIG. 1 shows a cross-sectional view of a radioactive-material container, the detector and their associated radiation shielding. It also shows the block diagram for its electronic signal processing system.

In FIG. 1, there is shown at 10 a specially-designed multidose radioactive source container 10 enclosed within radiation-shielding means which in this embodiment is a lead shield enclosure 12.

The design of this apparatus is such that when the container 10 is placed into its lead-shield enclosure 12, a small aliquot of the contained radioactive material fills the capilliary-type neck 14 of the container 10. The position of the container 10 in its lead-shield enclosure 12, is such that the neck 14, is pointing downward at approximately 45 degrees. In this position, doses may be easily withdrawn from the container 10 through the access port 16 provided at the lower end of the neck 14, such that neck 14 will always contain a representative sample of the total contents of the container 10. In all instances the volume of the neck 14 remains a constant, this constant depending upon design parameters. For explanation purposes herein, let us assume this constant volume to be 0.1 cc. The mouth 16 of the source container 10 is sealed with a rubber septum 18 which may be penetrated with a standard syringe needle, when desired. Radiation-detection means, which in this embodiment is a radiation-detector 20, is located near and at a right angle to, the neck 14 of container 10. This detector 20 is enclosed within a detector-positioning shield 22.

The design, construction, and assembly of both the detector-positioning shield 22 and the lead-shield enclosure 12 of container 10 is such that the sensing portion of the radiation-detector 20 is positioned at a fixed distance from the neck 14 of the source container 10, and "sees" the neck 14 only through a collimated gamma-ray entry port 24.

Recognizing that the apparatus counting-geometry remains constant and that the volume of the representative sample remains constant in this arrangement, it is apparent that the signal output from the detector 20 will change only with an increase or decrease in the amount of radioactivity in the neck of 14 of the source container 10. If signal-processing circuitry 26 is designed and calibrated to read millicuries of radioactivity sensed by the detector 20, then the amount of radioactivity contained in the fixed volume of the source container neck 14, i.e. in this 0.1 cc example may be determined. Accordingly, if the reading in this example is multiplied by 10, the result indicates the number of millicuries in a 1.0 cc volume, which by definition is concentration. Through the use of common electronic circuitry 26 and data handling and storage circuitry 30 this step can be performed, and the answer may be displayed and read out as "mCi/cc". Further, this resultant data may be stored in electronic memory circuitry 32 and used in calculating the volume of radioactive material to be withdrawn from the source container 10, to obtain a desired dose. All of the foregoing circuitry may be operated through the use of a common standard power supply 34.

To determine volume, the desired dose is divided by concentration as shown in the following formula;

$$V(cc) = \frac{Dose\ (mCi)}{Concentation\ (mCi/cc)}$$

The radiation-detector 20 used in the present embodiment is an ionization chamber hermetically sealed to eliminate changes in sensitivity due to pressure, temperature changes and moisture effects; and with the exception of its collimated gamma-ray entry port 24, is enclosed in the detector-positioning shield 22.

Alternative methods of radiation detection such as the use of a Geiger-Mueller tube or scintillation detector could be employed without changing the scope of this invention.

The preferred embodiment of this invention incorporates a digital display 32. Other forms of display could be used as well without changing the scope of this invention. A removeable radiation shield 36, shown positioned in opening 38, is used for the determination of percentage of radioactive contaminants in the contents of the source container 10.

Typically, in medical laboratories this is done to determine the percentage of Molybdenum impurities in Technetium $^{99M}$. The gamma emissions from Technetium $^{99M}$ have an energy of 140 KEV, whereas the energy of Molybdenum is higher than 140 KEV. When the detector 20 is exposed to the source sample, if any Molybdenum is present in our radioactive source, the radiation striking the detector causes an instrument reading composed of both Tc $^{99M}$ and Mo$^{99}$ components. By inserting a radiation shield 36 of the proper density through the opening 38 in shield 22, the 140 KEV gamma emissions from Tc $^{99M}$ can be filtered or screened out. If radioactivity readings for the source sample are made with and without the radiation shield 36 in place, the following equation will provide the percentage of Molybdenum contaminants in the Technetium $^{99M}$ source:

$$\frac{Reading\ \#1\ (shield\ in\ place)}{Reading\ \#2\ (no\ shield)} \times 100 = \%\ Molybdenum\ in\ the\ sample\ source.$$

In this fashion, through standard calculator circuitry, the "Molybdenum-breakthrough" percentage can be ascertained and visually displayed, without moving the source container 10 from its lead-shield enclosure 12.

In FIG. 2 there is shown a configuration of this invention adapted for automatically positioning one radioactive source container 46, out of several, in position for successive concentration and dose-volume determinations.

In this embodiment, a motor 40 may be used to drive carrousel 42 for positioning source containers 44 in proper position for either loading or dose withdrawal. The carrousel 42 shown for illustrative purposes is designed for enclosing four source containers, however similar carrousel arrangements may be designed for any convenient number of source containers.

Typically, for a nuclear medicine laboratory, such an apparatus might be designed to handle eight source containers. One position could be for Tc $^{99M}$, and the other for cold kit vials such as MAA, MDP, Liver Colloid, etc. In this type laboratory, although radioactive Technetium $^{99M}$ provides the source of gammarays for imagining various patient organs, compounds such as MAA (Macro Aggregated Albumin), MDP (Stannous Methylene Dishophonate) and others, are the vehicles through which the Tc $^{99M}$ localizes in the lung, bone, liver or other specific organ under study. By adding the proper amount of Tc $^{99M}$ to each of the "cold kit" vials, the carrousel virually becomes a drugstore for dispensing required doses of radioactive material throughout the day.

Through use of ordinary front-panel selector buttons and micro-switch circuitry, any source container position on the carrousel 42 may be programmed to stop in either the "sample load" or the "sample-withdrawal" position. As shown in FIG. 3, the system may be so designed that in the "sample-withdrawal" position, the source container neck 46 is pointing downward at any convenient angle, e.g. 45°, and in the "sample-load" position the container-neck 48 is pointing upward at a convenient angle such as 45°.

Referring to FIG. 4, all determinations for concentrations, dose volume or Molybdenum break-through are made with the source container 44 in the downward or "sample-withdrawal" position. In this position, the window 50 in the carrousel 42 is properly aligned so that radiation emitting from source container neck 46 will impinge on the radiation detector 52 located within shield 55.

Referring again to FIG. 2, a motor 54 has been added to electrically position the radiation shield 56 in between the neck 46 and collimator port 58 of detector 52 during Molybdenum break-through type determination. In this case, the radiation shield 56 is a disc of sufficient density to prevent the passage of the 140 KEV gamma-ray from a Tc$^{99M}$ source. One position on the disc contains a hole 57 which is programmed to be oriented between the detector 52 and source container 44 when "Molybdenum break through" tests are not being performed, and another position on the disc contains a radiation check source. This radioactive check source may be programmed to appear directly in front of the radiation detector 52 for testing system integrity on a day-to-day basis.

There is further shown in FIG. 2, common electronic circuitry 60, including signal amplifier circuitry 62, data handling and storage circuitry 64 and display circuitry 66, operated by a common power supply 68, which may be utilized to provide a read-out of the radioactivity sensed by the detector 52. This circuitry 60, is similar to the circuitry 26 shown in FIG. 1 and described earlier herein.

Having now described the invention in detail in accordance with requirements of the patent statutes, those skilled in the art will have no difficulty in making changes and modifications in the individual parts of their relative assemble in order to meet specific requirements or conditions. Such changes and modifications may be made without departing from the scope and spirit of the invention, as set forth in the following claims.

I claim:

1. An apparatus for directly determining the contration of radioactivity of a source in a radiation-shielded closed container and for determining the volume of material to be withdrawn from the container such that the withdrawn volume will constitute a predetermined dose of radioactivity, the determination and withdrawal of the desired amount of radioactive material being accomplished without removing the container from its radiation shield, said apparatus comprising in combination:

(a) a radioactive source container having a body in which the main volume of radioactive material is contained, said container being adapted for isolating an aliquot of predetermined volume of the radioactive material from the main volume;

(b) radiation-shielding means within which said container is enclosed, said radiation-shielding means being adapted for isolating the radiation of said aliquot from that the main volume of radioactive material within said container;

(c) radiation-detection means in operable association with said radiation-shielding means for sensing and converting the radiation from said aliquot into an electrical signal indicative of the concentration of radioactivity in the container.

2. The apparatus of claim 1, above, further comprising signal-amplification means, adapted for cooperative use with the radiation-detection means, for amplification of the electrical signal from said radiation-detection means.

3. The apparatus of claim 2, above, further, comprising data handling and storage means, adapted for cooperative use with the signal amplification means, for data handling and storage of the electronic signal from said signal-amplification means.

4. The apparatus of claim 3, above, further comprising concentration-displaying means adapted for cooperative use with said data handling and storage means, for displaying concentration of radioactivity in the radioactive source in said radiation-shielded closed container.

5. The apparatus of claim 4, above, further comprising volume-displaying means, adapted for cooperative use with said date handling and storage means, for displaying the volume of material of the radioactive source required to be withdrawn from the radiation-shielded source container to provide a predetermined dose of radioactivity.

6. The apparatus of claim 4, above, further comprising power supply means, adapted for cooperative use with, and for providing electric power to, said signal amplification means, said data handling and storage means and said concentration-displaying means.

7. The apparatus of claim 5, above, further comprising power supply means, adapted for cooperative use with, and for providing electrical power to, said signal amplification means, said data handling and storage means, said concentration-displaying means and said volume-displaying means.

8. The apparatus of claim 6, above wherein said radiation-shielding means comprises a carrousel which is adapted for enclosing a plurality of radioactive source containers and for moving each of said source containers into a preselected position, with respect to said radiation-detection means.

9. The apparatus of claim 6, above, wherein the radiation-detection means comprises an ionization chamber.

10. The apparatus of claim 6, above, wherein the radiation-detection means comprises a Geiger-Mueller tube.

11. The apparatus of claim 6, above, wherein the radiation-detection means comprises a scintillation detector.

12. The apparatus of claim 6, above, wherein the radiation-detection means comprises a solid-state detector.

13. The apparatus of claim 6, above, wherein the display means comprises an analog meter display.

14. The apparatus of claim 6, above, wherein the display means comprises a digital volt meter.

15. The apparatus of claim 6, above, wherein the display means comprises a cathode ray display.

16. The apparatus of claim 6, above, wherein the display means comprises a printer.

* * * * *